(12) United States Patent
Iftime et al.

(10) Patent No.: US 8,827,393 B2
(45) Date of Patent: Sep. 9, 2014

(54) FLUORESCENT PHASE CHANGE INK COMPOSITIONS

(71) Applicant: Xerox Corporation, Norwalk, CT (US)

(72) Inventors: Gabriel Iftime, Mississauga (CA);
Daryl W. Vanbesien, Burlington (CA);
Stephan V. Drappel, Toronto (CA);
Jennifer L. Belelle, Oakville (CA);
Adela Goredema, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/743,215

(22) Filed: Jan. 16, 2013

(65) Prior Publication Data

US 2014/0198143 A1   Jul. 17, 2014

(51) Int. Cl.
*B41J 29/38* (2006.01)
*G01D 11/00* (2006.01)
*B41J 2/01* (2006.01)
*C09D 11/00* (2014.01)

(52) U.S. Cl.
USPC .............. 347/6; 347/99; 347/107; 106/31.61

(58) Field of Classification Search
USPC .................. 347/99, 107; 106/31.61
See application file for complete search history.

(56) References Cited

U.S. PATENT DOCUMENTS

| | | |
|---|---|---|
| 4,490,731 A | 12/1984 | Vaught |
| 4,889,560 A | 12/1989 | Jaeger et al. |
| 4,889,761 A | 12/1989 | Titterington et al. |
| 5,195,430 A | 3/1993 | Rise et al. |
| 5,221,335 A | 6/1993 | Williams et al. |
| 5,231,135 A | 7/1993 | Machell et al. |
| 5,372,852 A | 12/1994 | Titterington et al. |
| 5,389,958 A | 2/1995 | Bui et al. |
| 5,621,022 A | 4/1997 | Jaeger et al. |
| 6,221,137 B1 | 4/2001 | King et al. |
| 6,472,523 B1 | 10/2002 | Banning et al. |
| 6,476,219 B1 | 11/2002 | Duff et al. |
| 6,576,747 B1 | 6/2003 | Carlini et al. |
| 6,576,748 B1 | 6/2003 | Carlini et al. |
| 6,590,082 B1 | 7/2003 | Banning et al. |
| 6,646,111 B1 | 11/2003 | Carlini et al. |
| 6,663,703 B1 | 12/2003 | Wu et al. |
| 6,673,139 B1 | 1/2004 | Wu et al. |
| 6,696,552 B2 | 2/2004 | Mayo et al. |
| 6,713,614 B2 | 3/2004 | Carlini et al. |
| 6,726,755 B2 | 4/2004 | Titterington et al. |
| 6,755,902 B2 | 6/2004 | Banning et al. |
| 6,821,327 B2 | 11/2004 | Jaeger et al. |
| 6,958,406 B2 | 10/2005 | Banning et al. |
| 7,053,227 B2 | 5/2006 | Jaeger et al. |
| 7,381,831 B1 | 6/2008 | Banning et al. |
| 7,427,323 B1 | 9/2008 | Birau et al. |
| 2008/0087190 A1* | 4/2008 | Iftime et al. ............... 106/31.15 |
| 2010/0083869 A1 | 4/2010 | Birau et al. |
| 2010/0084610 A1 | 4/2010 | Iftime et al. |
| 2012/0274699 A1* | 11/2012 | Belelie et al. ................. 347/20 |

OTHER PUBLICATIONS

U.S. Appl. No. 13/456,847, filed Apr. 26, 2012, Iftime et al.

* cited by examiner

*Primary Examiner* — Lisa M Solomon
(74) *Attorney, Agent, or Firm* — Pillsbury Winthrop Shaw Pittman LLP

(57) ABSTRACT

A phase change ink composition comprising an amorphous component, a crystalline material, a fluorescent material and optionally, a non-fluorescent colorant, which are suitable for ink jet printing, including printing on coated paper substrates. The novel phase change ink formulation allows the ink to change color when exposed to UV light, reversibly and multiple times, providing an ink suitable for use in security applications.

19 Claims, 2 Drawing Sheets

FLUORESCENT PHASE CHANGE INK COMPOSITIONS

CROSS-REFERENCE TO RELATED APPLICATIONS

Reference is made to commonly owned and co-pending, U.S. patent application Ser. No. 13/743,931 entitled "Photochromic Phase Change Ink Compositions" to Gabriel Rime et al., electronically filed on the same day herewith, the entire disclosure of which is incorporated herein by reference in its entirety.

BACKGROUND

The present embodiments relate to phase change ink compositions characterized by being solid at room temperature and molten at an elevated temperature at which the molten ink is applied to a substrate. These phase change ink compositions can be used for ink jet printing, and provide robust image quality on various substrates, including coated substrates, which are generally difficult to print on. The present embodiments provide the phase change ink composition with fluorescent additives which provide a robust ink for use in security applications. The present phase change inks comprise an amorphous component, a crystalline material, one or more fluorescent additives, and optionally a colorant, and methods of making the same.

Ink jet printing processes may employ inks that are solid at room temperature and liquid at elevated temperatures. Such inks may be referred to as phase change inks, hot melt inks, phase change inks and the like. For example, U.S. Pat. No. 4,490,731, the disclosure of which is totally incorporated herein by reference, discloses an apparatus for dispensing phase change ink for printing on a recording medium such as paper. In thermal ink jet printing processes employing hot melt inks, the phase change ink is melted by the heater in the printing apparatus and utilized (jetted) as a liquid in a manner similar to that of conventional thermal ink jet printing. Upon contact with the printing recording medium, the molten ink solidifies rapidly, enabling the colorant to substantially remain on the surface of the recording medium instead of being carried into the recording medium (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of nonprinting without the danger of nozzle clogging, even without capping the nozzles.

In general, phase change inks (sometimes referred to as "solid inks" or "hot melt inks") are in the solid phase at ambient temperature, but exist in the liquid phase at the elevated operating temperature of an ink jet printing device. At the jetting temperature, droplets of liquid ink are ejected from the printing device and, when the ink droplets contact the surface of the recording medium, either directly or via an intermediate heated transfer belt or drum, they quickly solidify to form a predetermined pattern of solidified ink drops.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes or pigments, namely, cyan, magenta, yellow and black, although the inks are not limited to these four colors. These subtractive primary colored inks can be formed by using a single dye or pigment or a mixture of dyes or pigments. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording medium (for example, paper, transparency material, and the like), the droplets solidify immediately upon contact with the recording medium, so that migration of ink along the printing medium is prevented and dot quality is improved.

While the above conventional phase change ink technology is successful in producing vivid images and providing economy of jet use and substrate latitude on porous papers, a need remains for additional means for robust printing for security applications on various substrates, including coated paper substrates. As such, there is a need to provide novel compositions for phase change ink compositions and security printing technologies to provide customers with excellent image quality on all substrates.

Each of the foregoing U.S. Patents and Patent Publications are incorporated by reference herein. Further, the appropriate components and process aspects of the each of the foregoing U.S. Patents and Patent Publications may be selected for the present disclosure in embodiments thereof.

SUMMARY

According to embodiments illustrated herein, there is provided a phase change ink comprising: a crystalline component having a viscosity of less than 12 cps at a temperature of about 140° C. and a viscosity of greater than $1 \times 10^6$ cps at room temperature; an amorphous component having a viscosity of less than 100 cps at a temperature of about 140° C. and a viscosity of greater than $1 \times 10^6$ cps at room temperature; a fluorescent material; and an optional non-fluorescent colorant.

In particular, the present embodiments provide a phase change ink comprising: a crystalline component having a viscosity of less than 12 cps at a temperature of about 140° C. and a viscosity of greater than $1 \times 10^6$ cps at room temperature; an amorphous component having a viscosity of less than 100 cps at a temperature of about 140° C. and a viscosity of greater than $1 \times 10^6$ cps at room temperature; a fluorescent material; and a non-fluorescent colorant selected from the group consisting of a pigment, dye or mixtures thereof.

In further embodiments, there is provided a method for confirming authenticity of an item, comprising: providing a phase change ink for use in an inkjet printing apparatus, comprising: crystalline component having a viscosity of less than 12 cps at a temperature of about 140° C. and a viscosity of greater than $1\times10^6$ cps at room temperature, an amorphous component having a viscosity of less than 100 cps at a temperature of about 140° C. and a viscosity of greater than $1\times10^6$ cps at room temperature, a fluorescent material, and an optional non-fluorescent colorant; using the phase change ink in an inkjet printing apparatus to form text or image on an item; exposing the formed text or image on the item to ultraviolet light; and confirming a color change to the formed text or image upon exposure to the ultraviolet light, wherein the color change confirms authenticity of the item.

BRIEF DESCRIPTION OF THE DRAWINGS

For a better understanding, reference may be made to the accompanying figures.

DETAILED DESCRIPTION

Figure 1:
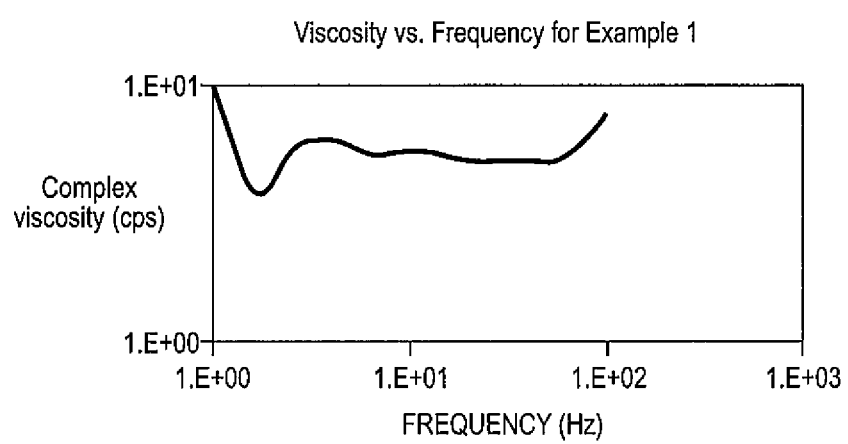
FIG. 1 is a graph illustrating viscosity versus frequency of the ink of Example 1.

In the following description, it is understood that other embodiments may be utilized and structural and operational changes may be made without departure from the scope of the present embodiments disclosed herein.

Phase change ink technology broadens printing capability and customer base across many markets, and the diversity of printing applications will be facilitated by effective integration of printhead technology, print process and ink materials. The phase change ink compositions are characterized by being solid at room temperature (e.g., 20-27° C.) and molten at an elevated temperature at which the molten ink is applied to a substrate. As discussed above, while current ink options are successful for porous paper substrates, these options are not always satisfactory for coated paper substrates. Thus, the present embodiments provide a phase change ink that can produce robust image quality on coated and uncoated substrates.

It has been discovered that using a mixture of crystalline and amorphous components in phase change ink formulations provides robust inks, and in particular, phase change inks which demonstrate robust images on uncoated and coated paper. Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature ($\leq 140°$ C.). In the present embodiments, however, it is discovered that a robust phase change ink can be obtained through a blend of crystalline and amorphous components.

The present embodiments provide a new type of ink jet phase change ink composition which comprises a blend of (1) crystalline and (2) amorphous components, generally in a weight ratio of from about 60:40 to about 95:5, respectively. In more specific embodiments, the weight ratio of the crystalline to amorphous component is from about 65:35 to about 95:5, or is from about 70:30 to about 90:10. In one embodiment, the weight ratio is 70:30 for the crystalline and amorphous components, respectively. In another embodiment, the weight ratio is 80:20 for the crystalline and amorphous components, respectively.

The present embodiments further provide a phase change ink formulation that can be used for security applications. Because the inks of the present embodiments provide excellent robustness, these inks provide an ideal option for packaging applications. In the packaging industry, there is a growing need for security, which the present inks address. The present inks comprise crystalline-amorphous components with fluorescent additives. The resulting ink can be colorless under normal ambient light but becomes colored when viewed with ultraviolet (UV) light. Normal ambient light refers to light usually suitable for reading printed materials. This includes indoor light as well as sunlight. More specifically, in this embodiment, the ink is clear and colorless under normal reading light which provides an ink and prints which appear essentially colorless in normal reading light but emit a selected light when examined under UV light. In an alternative embodiment, the ink is colored under normal light but changes to another color when viewed with UV light. More specifically, in this embodiment, the ink is colored with a colored pigment and therefore appears colored in normal light but also emits color under UV light. The emitted color may be the same or different from permanent color of the pigment.

As such, the present embodiments may be used in security applications to print pictures, text or codes for encrypted documents in connection with detecting counterfeiting. For example, the ink of the present embodiments may be used on a package or label on a product. The ability of the ink to change to a colored state from a colorless state or from one colored state to another colored state when seen under UV light can prove authenticity. A counterfeit would not exhibit a color change under UV light.

While fluorescent additives are known in the art, these additives have never been successfully integrated into a robust ink for printing on coated substrates. The present embodiments provide a novel ink composition comprising the fluorescent additives along with specific crystalline and amorphous components which results in a phase change ink with improved robustness and fast crystallization rate that can be used for various security applications. Moreover, successful integration of the fluorescent additives into the present ink compositions required much research and testing to achieve the proper ink components and ratios for compatibility, miscibility and/or degradability under operational use conditions.

Each component imparts specific properties to the phase change inks, and the blend of the components provide inks that exhibit excellent robustness on uncoated and coated substrates.

Crystalline Component

The crystalline component in the ink formulation drives the phase change through rapid crystallization on cooling. The crystalline component also sets up the structure of the final ink film and creates a hard ink by reducing the tackiness of the amorphous component. The crystalline components exhibit crystallization, relatively low viscosity ($\leq 10^1$ centipoise (cps), or from about 0.5 to about 10 cps, or from about 1 to about 10 cps) at about 140° C. and high viscosity (>$10^6$ cps) at room temperature. Because the crystalline components dictate the phase change of the ink, rapid crystallization is required to allow further immediate print processing if required (i.e., spreading, duplex printing, etc.) and to prevent excessive showthrough on uncoated substrates. By differential scanning calorimetry (DSC) (10° C./min from −50 to 200 to −50° C.), desirable crystalline components show sharp crystallization and melting peaks, and the ΔT between them is less than 55° C. The melting point must be below 150° C., which is the upper limit of the jetting temperature, or preferably below from about 145 to about 140° C. The melting point is preferably above 65° C. to prevent blocking and print transfer upon standing at temperatures up to 65° C., or more preferably above about 66° C. or above about 67° C. Crystalline-amorphous compositions include a mixture of a suitable crystalline component and an amorphous component.

The crystalline component may include amides, aromatic esters, ester of an aliphatic linear diacid, urethanes, sulfones, or mixtures thereof. Specific examples of suitable crystalline materials are illustrated in Table 1.

Amorphous Component

The amorphous components provide tackiness and impart robustness to the printed ink. In the present embodiments, desirable amorphous materials have relatively low viscosity (<$10^2$ cps, or from about 1 to about 100 cps, or from about 5 to about 95 cps) at about 140° C., but very high viscosity (>$10^6$ cps) at room temperature. The low viscosity at 140° C. provides wide formulation latitude while the high viscosity at room temperature imparts robustness. The amorphous materials have $T_g$s (glass transition temperatures) but do not exhibit crystallization and melting peaks by DSC (10° C./min from −50 to 200 to −50° C.). The $T_g$ values are typically from about 10 to about 50° C., or from about 10 to about 40° C., or from about 10 to about 35° C., to impart the desired toughness and flexibility to the inks. The selected amorphous materials have low molecular weights, such as less than 1000 g/mol, or from about 100 to about 1000 g/mol, or from about 200 to about 1000 g/mol, or from about 300 to about 1000 g/mol. Higher molecular weight amorphous materials such as polymers become viscous and sticky liquids at high temperatures, but have viscosities that are too high to be jettable with piezoelectric printheads at desirable temperatures.

The amorphous compound includes esters of tartaric acid and citric acid, amorphous urethanes and amorphous amides, or mixtures thereof. Specific examples of suitable amorphous materials are illustrated in Table 2.

TABLE 1

| Compound | Structure | $T_{melt}$ (° C.)* | $T_{crys}$ (° C.)* | ΔT (° C.) | η @ 140° C. (cps)** | η @ RT (cps)** |
|---|---|---|---|---|---|---|
| 1 | | 110 | 83 | 27 | 4.7 | >$10^6$ |
| 2 | | 98 | 71 | 27 | 2.9 | >$10^6$ |
| 3 | | 119 | 80 | 39 | 3.3 | >$10^6$ |
| 4 | | 125 | 75 | 50 | 3.0 | >$10^6$ |
| Target | | <140° C. | >65° C. | 50° C. | <10 cps | >$10^6$ cps |

*The samples were measured on a Q1000 Differential Scanning Calorimeter (TA Instruments) at a rate of 10° C./min from −50° C. to 200° C. to −50° C.; midpoint values are quoted.
**The samples were measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

TABLE 2

| Compound | Structure | Tg (° C.)* | η @ 140° C. (cps)** | MW (g/mol) |
|---|---|---|---|---|
| 5 | | 19 | 10 | 426.59 |
| 6 | | 18 | 10 | 426.59 |
| 7 | | 13 | 10 | 426.59 |
| 8 | | 11 | 27 | 606.87 |
| Target | | 10-50° C. | <100 cps | <1000 g/mol |

*The samples were measured on a Q1000 Differential Scanning Calorimeter (TA Instruments) at a rate of 10° C./min from −50° C. to 200° C. to −50° C.; midpoint values are quoted.
**The samples were measured on a RFS3 controlled strain Rheometer (TA instruments) equipped with a Peltier heating plate and using a 25 mm parallel plate. The method used was a temperature sweep from high to low temperatures, in temperature decrements of 5° C., a soak (equilibration) time of 120 seconds between each temperature and at a constant frequency of 1 Hz.

Fluorescent Material

Suitable fluorescent materials include fluorescent dyes and fluorescent nano-pigments which are compatible with the ink carrier. Dyes have good solubility and dispersibility within the ink carrier. Nano-pigments have excellent thermal and light-fast performance.

Examples of fluorescent dyes suitable for use herein include those belonging to the dye families known as rhodamines, fluoresciens, coumarins, napthalimides, benzoxanthenes, acridines, azos, coordination complexes of rare earth metal ions, mixtures thereof and the like.

The fluorescent materials generally do not include fluorescent pigments because typically, such composite particles are made of fluorescent materials dispersed in hard and robust polymer matrix, and are typically of a particle size ranging from 1-5 microns. Such large-sized particles are not suitable for inkjet printing as they may plug the print-head nozzles. However, the fluorescent nano-pigments of the present embodiments have a particle size smaller than about 500 nm, or in embodiments, from about 100 to about 300 nm, or in further embodiments, from about 80 to about 250 nm. These sizes are suitable for inkjet printing because they are jettable through inkjet printhead nozzles without the risk of plugging the nozzles.

The fluorescent material is selected such as to have high absorbance of the exciting UV light used for authentication. Typically the wavelength used for fluorescence excitation is in the range of about 250 nm to about 400 nm. An example of a suitable excitation wavelength is 365 nm, widely available for example with devices used for checking the authenticity of bills. An important requirement relative to the fluorescent and ink materials is that at the excitation wavelength the ink materials must have low absorption while the fluorescent materials must have high absorbance. If both the fluorescent materials and the ink materials have high absorbance at excitation wavelength then much of the incident UV light is absorbed by the ink materials instead of the fluorescent materials. Therefore this would result in lowering or even cancelling the fluorescence response of the fluorescent ink. As an illustrative example, if the excitation wavelength is 365 nm, the fluorescent materials should have high absorbance at this wavelength and the ink materials (including permanently colored dyes or pigments should have a lower absorbance at the same wavelength when compared with the fluorescent materials). This is required in order to maximize detection response when activated with UV light. It is preferred that at the activation wavelength, or the wavelength at which fluorescence is detected, the ratio between the absorbance of the fluorescent compound and the remaining components of the ink be higher than 1.

The fluorescent ink of the present embodiments are suitable for high speed printing, typically 200 ppm or higher. The ink must solidify completely before next paper is placed on top of it, at the print speed in order to avoid sticking of successive prints on top of each other. A key requirement for the selection of the fluorescent dyes is that their addition should not slow down the crystallization rate of the ink significantly. Desirable are fluorescent dyes which result in fluorescent inks with a crystallization rate of no more than 1.5 times slower (or ⅔) of the ink without the fluorescent additive. The concern is that prior literature showed that generally, the addition of an organic material additive, particularly organic dyes to crystalline-amorphous inks slows down the crystallization rate of the ink. Therefore selection of fluorescent dyes which have minimal impact onto the rate of crystallization of the ink is of major importance.

A first class of suitable fluorescent nanoparticle pigment consists of a fluorescent compound including at least one functional moiety and a stabilizer compound including at least one functional group, wherein the functional moiety associates non-covalently with the at least one functional group. Suitable fluorescent compounds include benzothioxanthene derivatives as disclosed in U.S. Patent Publication No. 2010/0083869, which is incorporated by reference in its entirety. The one functional group of the stabilizer is typically a sterically bulky stabilizer selected from the group consisting of beta-amino carboxylic acids and their salts and esters containing at least large aromatic moieties or long linear or branched aliphatic chains; beta-hydroxy carboxylic acids and their esters containing long linear or branched aliphatic chains; sorbitol esters with long chain aliphatic carboxylic acids; and polymeric compounds. In specific examples the stabilizer can be mono and triesters of sorbitol with palmitic acid, stearic acid, or oleic acid; tartaric acid esters with cyclohexanol; and polymers.

Another type of fluorescent organic nanoparticle, is a composite nanoparticle comprising a polymeric matrix comprising one or more crosslinked polymer resins and one or more fluorescent dyes, wherein the fluorescent dyes are incorporated into the polymer matrix. The fluorescent organic nanoparticles have a size of less than 500 nanometers (nm), such as less than about 200 nm, or less than about 100 nm. The fluorescent dye could be any fluorescent dye which is soluble in the polymeric matrix. In some embodiments the crosslinked polymer is a crosslinked polyester resin such as propoxylated bisphenol A fumarate resin. These nanoparticles are made by preparing a polymer latex by using an emulsion aggregation process, as disclosed in U.S. Patent Publication No. 2010/0084610, which is incorporated by reference in its entirety. A crosslinking initiator is added to the resin latex or emulsion to initiate crosslinking. The crosslinking is typically initiated thermally.

Suitable fluorescent dyes and pigments are commercially available from, for example, Risk Reactor Corp. (Santa Ana, Calif.) or from DayGlo Color Corp. (Cleveland, Ohio)

The fluorescent materials are present in the phase change ink in an amount of from about 0.01 to about 15 percent by weight, or from about 0.1 to about 10 percent by weight, or from about 0.5 to about 10 percent by weight of the total weight of the phase change ink.

Ink Carrier

In embodiments, the ink carriers for the phase change inks may have melting points of from about 65° C. to about 150° C., for example from about 70° C. to about 140° C., from about 75° C. to about 135° C., from about 80° C. to about 130° C., or from about 85° C. to about 125° C. as determined by, for example, by differential scanning calorimetry at a rate of 10° C./min. The ink carrier, in embodiments, is non-aqueous. In embodiments, the resulting ink has a melting point of from about 65 to about 140° C., or from about 65 to about 135° C., or from about 70 to about 130° C. In embodiments, the resulting ink has a crystallization point of from about 65 to about 130° C., or from about 66 to about 125° C., or from about 66 to about 120° C. In further embodiments, the resulting ink has a viscosity of from about 1 to about 15 cps, or from about 2 to about 14 cps, or from about 3 to about 13 cps at about 140° C. At room temperature, the resulting ink has a viscosity of about $10^6$ cps.

Additives

The ink of embodiments may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX 1098, available from BASF); 2,2-bis (4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX-398, available from Albermarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl)benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD 76, NAUGARD 445, NAUGARD 512, and NAUGARD 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

Colorant

In embodiments, the phase change ink compositions described herein also include a non-fluorescent colorant. The ink of the present embodiments can thus be one with or without colorants. The phase change ink may optionally contain colorants such as dyes or pigments. The colorants can be either from the cyan, magenta, yellow, black (CMYK) set or from spot colors obtained from custom color dyes or pigments or mixtures of pigments. Dye-based colorants are miscible with the ink base composition, which comprises the crystalline and amorphous components and any other additives.

In embodiments, the phase change ink compositions described herein also include a colorant. Any desired or effective colorant can be employed in the phase change ink compositions, including dyes, pigments, mixtures thereof, and the like, provided that the colorant can be dissolved or dispersed in the ink carrier. Any dye or pigment may be chosen, provided that it is capable of being dispersed or dissolved in the ink carrier and is compatible with the other ink components. The phase change carrier compositions can be used in combination with conventional phase change ink colorant materials, such as Color Index (C.I.) Solvent Dyes, Disperse Dyes, modified Acid and Direct Dyes, Basic Dyes, Sulphur Dyes, Vat Dyes, and the like. Examples of suitable dyes include Neozapon Red 492 (BASF); Orasol Red G (Pylam Products); Direct Brilliant Pink B (Oriental Giant Dyes); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol Brilliant Yellow 4GF (Clariant); Cibanone Yellow 2G (Classic Dyestuffs); Orasol Black RLI (BASF); Orasol Black CN (Pylam Products); Savinyl Black RLSN (Clariant); Pyrazol Black BG (Clariant); Morfast Black 101 (Rohm & Haas); Diaazol Black RN (ICI); Thermoplast Blue 670 (BASF); Orasol Blue GN (Pylam Products); Savinyl Blue GLS (Clariant); Luxol Fast Blue MBSN (Pylam Products); Sevron Blue 5GMF (Classic Dyestuffs); Basacid Blue 750 (BASF); Keyplast Blue (Keystone Aniline Corporation); Neozapon Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen Blue FF-4012 (BASF); Fatsol Black BR (C.I. Solvent Black 35) (Chemische Fabriek Triade By); Morton Morplas Magenta 36 (C.I. Solvent Red 172); metal phthalocyanine colorants such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are herein entirely incorporated herein by reference, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, Solvent Yellow 162, Acid Red 52, Solvent Blue 44, and uncut Reactint Violet X-80.

Pigments are also suitable colorants for the phase change inks. Examples of suitable pigments include PALIOGEN Violet 5100 (BASF); PALIOGEN Violet 5890 (BASF); HELIOGEN Green L8730 (BASF); LITHOL Scarlet D3700 (BASE); SUNFAST Blue 15:4 (Sun Chemical); Hostaperm Blue B2G-D (Clariant); Hostaperm Blue B4G (Clariant); Permanent Red P-F7RK; Hostaperm Violet BL (Clariant); LITHOL Scarlet 4440 (BASF); Bon Red C (Dominion Color Company); ORACET Pink RF (BASF); PALIOGEN Red 3871 K (BASF); SUNFAST Blue 15:3 (Sun Chemical); PALIOGEN Red 3340 (BASF); SUNFAST Carbazole Violet 23 (Sun Chemical); LITHOL Fast Scarlet L4300 (BASF); SUNBRITE Yellow 17 (Sun Chemical); HELIOGEN Blue L6900, L7020 (BASF); SUNBRITE Yellow 74 (Sun Chemical); SPECTRA PAC C Orange 16 (Sun Chemical); HELIOGEN Blue K6902, K6910 (BASF); SUNFAST Magenta 122 (Sun Chemical); HELIOGEN Blue D6840, D7080 (BASF); Sudan Blue OS (BASF); NEOPEN Blue FF4012 (BASF); PV Fast Blue B2GO1 (Clariant); IRGALITE Blue GLO (BASF); PALIOGEN Blue 6470 (BASF); Sudan Orange G (Aldrich); Sudan Orange 220 (BASF); PALIOGEN Orange 3040 (BASF); PALIOGEN Yellow 152, 1560 (BASF); LITHOL Fast Yellow 0991 K (BASF); PALIOTOL Yellow 1840 (BASF); NOVOPERM Yellow FGL (Clariant); Ink Jet Yellow 4G VP2532 (Clariant); Toner Yellow HG (Clariant); Lumogen Yellow D0790 (BASF); Suco-Yellow L1250 (BASF); Suco-Yellow D1355 (BASF); Suco Fast Yellow D1355, D1351 (BASF); HOSTAPERM Pink E 02 (Clariant); Hansa Brilliant Yellow 5GX03 (Clariant); Permanent Yellow GRL 02 (Clariant); Permanent Rubine L6B 05 (Clariant); FANAL Pink D4830 (BASF); CINQUASIA Magenta (DU PONT); PALIOGEN Black L0084 (BASF); Pigment Black K801 (BASF); and carbon blacks such as REGAL 330™ (Cabot), Nipex 150 (Evonik) Carbon Black 5250 and Carbon Black 5750 (Columbia Chemical), and the like, as well as mixtures thereof.

Pigment dispersions in the ink base may be stabilized by synergists and dispersants. Generally, suitable pigments may be organic materials or inorganic. Magnetic material-based pigments are also suitable, for example, for the fabrication of robust Magnetic Ink Character Recognition (MICR) inks. Magnetic pigments include magnetic nanoparticles, such as for example, ferromagnetic nanoparticles.

Also suitable are the colorants disclosed in U.S. Pat. No. 6,472,523, U.S. Pat. No. 6,726,755, U.S. Pat. No. 6,476,219, U.S. Pat. No. 6,576,747, U.S. Pat. No. 6,713,614, U.S. Pat. No. 6,663,703, U.S. Pat. No. 6,755,902, U.S. Pat. No. 6,590,082, U.S. Pat. No. 6,696,552, U.S. Pat. No. 6,576,748, U.S. Pat. No. 6,646,111, U.S. Pat. No. 6,673,139, U.S. Pat. No. 6,958,406, U.S. Pat. No. 6,821,327, U.S. Pat. No. 7,053,227, U.S. Pat. No. 7,381,831 and U.S. Pat. No. 7,427,323, the disclosures of each of which are incorporated herein by reference in their entirety.

The colorant may be present in the phase change ink in any desired or effective amount to obtain the desired color or hue such as, for example, at least from about 0.1 percent by weight of the ink to about 50 percent by weight of the ink, at least from about 0.2 percent by weight of the ink to about 20 percent by weight of the ink, and at least from about 0.5 percent by weight of the ink to about 10 percent by weight of the ink.

The ink compositions can be prepared by any desired or suitable method. For example, each of the components of the ink carrier can be mixed together, followed by heating, the mixture to at least its melting point, for example from about 60° C. to about 150° C., 80° C. to about 145° C. and 85° C. to about 140° C. The colorant may be added before the ink ingredients have been heated or after the ink ingredients have been heated. When pigments are the selected colorants, the molten mixture may be subjected to grinding in an attritor or media mill apparatus to effect dispersion of the pigment in the ink carrier. The heated mixture is then stirred for about 5 seconds to about 30 minutes or more, to obtain a substantially homogeneous, uniform melt, followed by cooling the ink to ambient temperature (typically from about 20° C. to about 25° C.). The inks are solid at ambient temperature. The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. In another specific embodiment, both the intermediate transfer member and the final recording sheet are heated; in this embodiment, both the intermediate transfer member and the final recording sheet are heated to a temperature below that of the melted ink in the printing apparatus; in this embodiment, the relative temperatures of the intermediate transfer member and the final recording sheet can be (1) the intermediate transfer member is heated to a temperature above that of the final recording substrate and below that of the melted ink in the printing apparatus; (2) the final recording substrate is heated to a temperature above that of the intermediate transfer member and below that of the melted ink in the printing apparatus; or (3) the intermediate transfer member and the final recording sheet are heated to approximately the same temperature. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

Any suitable substrate or recording sheet can be employed, including plain papers such as XEROX 4200 papers, XEROX Image Series papers, Courtland 4024 DP paper, ruled notebook paper, bond paper, silica coated papers such as Sharp Company silica coated paper, JuJo paper, HAMMERMILL LASERPRINT paper, and the like, glossy coated papers such as XEROX Digital Color Elite Gloss, Sappi Warren Papers LUSTROGLOSS, specialty papers such as Xerox DURAPAPER, and the like, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Preparation of the Ink Base

The ink base comprises a crystalline component at 80% by weight (8.0 g) and amorphous component at 20% by weight (2.0 g). (see Table 3). This composition is stirred at 130° C. for 30 minutes.

TABLE 3

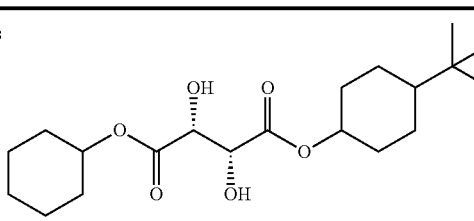

| Crystalline. Component | Amorphous Component |
|---|---|
| Distearylterephthalate, 80% | and mixtures TBCT, 20% |

Preparation of the Inks

Inks were prepared by adding the components together in a beaker and heating to 130° C. while stirring, and maintaining heat for two hour. K-proofs of the inks were prepared on coated Xerox® paper (DCEG) for a red fluorescent ink and black substrate for a green fluorescent ink.

Example 1

Red Fluorescent Ink

A red fluorescent ink was prepared as described above with a 2 weight percent DFKY-C7 dye which is a coordination compounds of a lanthanide, commercially available from Risk Reactor was used.

Example 2

Green Fluorescent Ink

A green fluorescent ink was prepared as described above with a 2 weight percent 2-hydrozy phenyl benzothiazole commercially available from Sigma Aldrich.

Ink Testing

The following aspects were investigated: (i) viscosity at jetting temperature; (ii) rate of crystallization of the inks; and (iii) fluorescence emission capability demonstration in a range suitable for colored UV inks.

Rheology of Ink from Example 1

Figure 2:
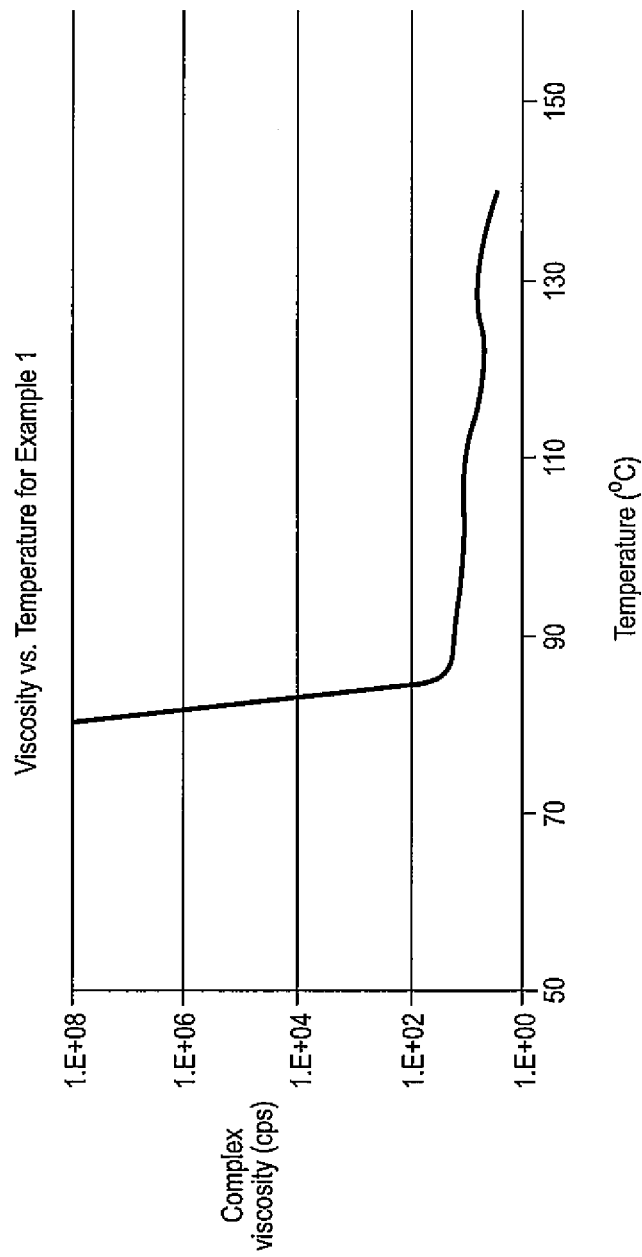
FIG. 2. Is a graph illustrating the viscosity versus temperature of the ink of Example 1.

Rheology was measured for fluorescent red ink from Example 1. Viscosity versus frequency in FIG. 1 shows that the ink is Newtonian, meaning the viscosity does not change with varying frequencies which is the desired state. Viscosity versus temperature in FIG. 2 shows that the ink is below 10 cps (jettable) at temperatures of 120° C. or higher which falls within the desired viscosity range of about 10-12 cps (which exhibits good jettability). Ink from Example 2 was not measured because it is expected that there will be no difference compared to Example 1.

Rate of Crystallization

The rate of crystallization was measured by the standardized Time Resolved Optical Microscopy (TROM) procedure, which provides comparison between various test samples and, as a result, is a useful tool for monitoring the progress made with respect to the design of fast crystallizing inks. TROM is described in U.S. patent application Ser. No. 13/456,847 to Gabriel Iftime et al., electronically filed on Apr. 26, 2012, which is hereby incorporated by reference in its entirety.

The sample was quenched from the melting temperature to 40° C. and the crystallization process was followed by Polarized Optical Microscopy. The addition of the fluorescent additive did not change the rate of crystallization of the ink: Ttotal is 3 seconds for both ink base and ink with the fluorescent material (Example 1), as shown in Table 4. The total time of crystallization is 3 seconds. Correlation studies between TROM numbers and printing speed of the print test fixture showed that inks with a total time of crystallization of 3 seconds by TROM are fast enough to print at high speed on the print test fixture without blocking. In embodiments, the ink is capable of being printed at speeds of 200 pages per minute or higher with a direct to paper sheet fed or continuous print device without successive papers sticking and requiring no delay prior to cutting and/or stacking the sheets. Therefore, the fluorescent ink of the present embodiments is demonstrated to be suitable for fast printing on a high speed print test fixture. Prior literature has shown that typically the addition of a dye to a crystalline-amorphous ink generally slows down the crystallization process. These results illustrate the need for experimentation and careful selection of the fluorescent dye additives such as to not increase significantly the rate of crystallization of the fluorescent ink.

TABLE 4

| Sample | Formulation Details | Ttest (° C.) | Tcrys onset (s) | Tcrys elapsed (s) | Tcrys total (s) |
|---|---|---|---|---|---|
| Ink Base | Ink Base | 140 | 2 | 1 | 3 |
| (Example 1) | Ink Base w/ Red Fluorescent Material | 140 | 2 | 1 | 3 | fluorescence Emission (Detection)

Test samples were prepared by K-proofing inks of interest. K-proofing process comprises the placing a thin layer of tested ink onto paper substrate from a plate which is heated such as to melt the ink. The benefit of the K-proofing is that it provides an area of ink onto the paper which has a thickness of several microns, i.e. similar to the thickness of images of printed inks. K-proofed fluorescent ink of Example 1 was then viewed under normal ambient or reading light and under UV light. The K-proofed fluorescent ink from Example 1 appears colorless under normal viewing conditions. When exposed to UV light it shows a reddish color, due to the fluorescence emitted by the fluorescent material. Red color emission is particularly of interest for printing on white cardboard, where other emitted colors (e.g., green or blue) become undetectable because the very strong blue color emission of the white paper under UV light due to optical brighteners from the paper substrate. When printed on darker substrates other emitted colors are suitable, including green or blue.

The fluorescent ink of Example 2 was also viewed under normal ambient or reading light and under UV light when printed on black paper substrate. The K-proofed fluorescent ink from Example 2 appears clear under normal light conditions and shows a greenish color under UV light.

The fluorescent system is ideally suited for darker (less bright substrates), whereas a photochromic system is ideally suited for darker (less bright substrates).

Color combination (multiple color emission) can be achieved by mixing fluorescent materials at the desired ratios. This demonstrates color change capability of the security ink provided by the present embodiments.

SUMMARY

In summary, a novel phase change ink composition is provided which comprises a crystalline-amorphous composition containing a fluorescent material and an optional non-fluorescent colorant. The ink changes color when exposed to UV light, reversibly and multiple times.

The ink can be used as a security fluorescent robust ink to provide security to documents and to packages and labels. The ink is ideally suited for colored or dark substrates and further for situations where the security feature needs to be invisible under normal ambient light. This ink provides a phase change ink for security applications where prior phase change inks were not suitable.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A phase change ink comprising:
   a crystalline component having a viscosity of less than 12 cps at a temperature of about 140° C. and a viscosity of greater than $1\times10^6$ cps at room temperature;
   an amorphous component having a viscosity of less than 100 cps at a temperature of about 140° C. and a viscosity of greater than $1\times10^6$ cps at room temperature;
   a fluorescent material; and
   an optional non-fluorescent colorant, wherein a ratio between the absorbance of the fluorescent compound and the remaining components of the ink at an activation wavelength is higher than 1.

2. The phase change ink of claim 1 being capable of being printed at speeds of 200 pages per minute or higher with a direct to paper sheet fed or continuous print device without successive papers sticking and requiring no delay prior to cutting and/or stacking the sheets.

3. The phase change ink of claim 1, wherein the crystalline and amorphous components are blended in a weight ratio of from about 65:35 to about 95:5, respectively.

4. The phase change ink of claim 3, wherein the crystalline and amorphous components are blended in a weight ratio of from about 70:30 to about 90:10, respectively.

5. The phase change ink of claim 1, wherein the crystalline component is selected from the group consisting of

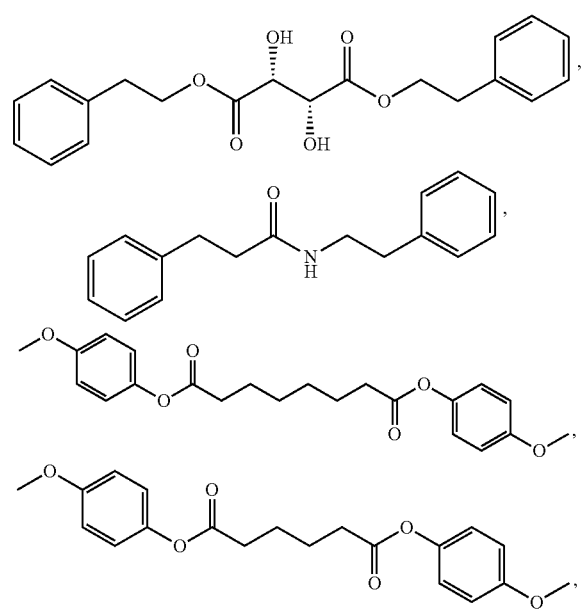

stereoisomers thereof and mixtures thereof.

6. The phase change ink of claim 1, wherein the amorphous component is selected from the group consisting of

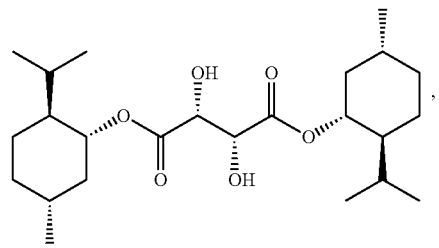

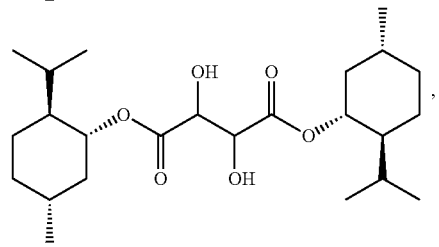

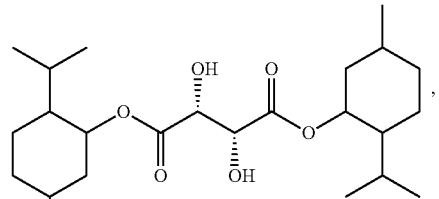

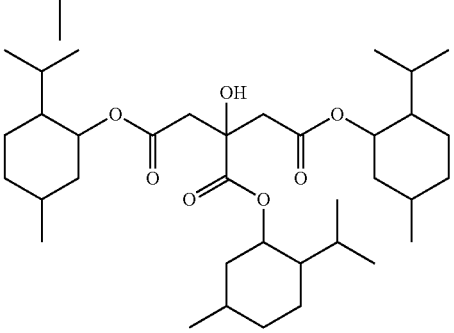

stereoisomers thereof and mixtures thereof.

7. The phase change ink of claim 1, wherein the fluorescent material is present in an amount of from about 0.01 to about 15 percent by weight of the total weight of the phase change ink.

8. The phase change ink of claim 1, wherein the fluorescent material is selected from the group consisting of a fluorescent dye, fluorescent nano-pigment, and mixtures thereof.

9. The phase change ink of claim 8, wherein the fluorescent dye is selected from the group consisting of rhodamines, fluoresciens, coumarins, napthalimides, benzoxanthenes, acridines, azos, coordination complexes of rare earth metal ions, and mixtures thereof.

10. The phase change ink of claim 8, wherein the fluorescent nano-pigment is selected from the group consisting of (a) a fluorescent compound including at least one functional moiety and a stabilizer compound including at least one functional group, wherein the functional moiety associates non-covalently with the at least one functional group and wherein the fluorescent compound is a benzothioxanthene derivative; (b) a composite nanoparticle comprising a polymeric matrix comprising one or more crosslinked polymer resins and one or more fluorescent dyes, wherein the fluorescent dyes are incorporated into the polymer matrix; and mixtures thereof.

11. The phase change ink of claim 8, wherein the fluorescent nano-pigment has a particle size of less than 500 nm.

12. A method for confirming authenticity of an item, comprising:
   providing a phase change ink for use in an inkjet printing apparatus, comprising:
      a crystalline component having a viscosity of less than 12 cps at a temperature of about 140° C. and a viscosity of greater than $1 \times 10^6$ cps at room temperature,
      an amorphous component having a viscosity of less than 100 cps at a temperature of about 140° C. and a viscosity of greater than $1 \times 10^6$ cps at room temperature,
      a fluorescent material, and
      an optional non-fluorescent colorant, wherein the phase change ink is capable of being printed at speeds of 200 pages per minute or higher with a direct to paper sheet fed or continuous print device without successive papers sticking and requiring no delay prior to cutting and/or stacking the sheets;
   using the phase change ink in an inkjet printing apparatus to form text or image on an item;
   exposing the formed text or image on the item to ultraviolet light; and
   confirming a color change to the formed text or image upon exposure to the ultraviolet light, wherein the color change confirms authenticity of the item.

13. The method of claim 12, wherein the color change is from a colorless state to a colored state.

14. The method of claim 12, wherein the color change is from a colored state to a different colored state.

15. The method of claim 12, wherein the color change is reversible once the ultraviolet light is removed.

16. The method of claim 12, wherein the item is a packaging container, document, or a label.

17. The method of claim 12, wherein the fluorescent material is present in an amount of from about 0.01 to about 15 percent by weight of the total weight of the phase change ink.

18. The method of claim 12, wherein the fluorescent material is selected from the group consisting of a fluorescent dye, fluorescent nano-pigment, and mixtures thereof.

19. A phase change ink comprising:
   a crystalline component having a viscosity of less than 12 cps at a temperature of about 140° C. and a viscosity of greater than $1 \times 10^6$ cps at room temperature;
   an amorphous component having a viscosity of less than 100 cps at a temperature of about 140° C. and a viscosity of greater than $1 \times 10^6$ cps at room temperature;
   a fluorescent material; and
   an optional non-fluorescent colorant, wherein the fluorescent material is selected from the group consisting of a fluorescent dye, fluorescent nano-pigment, and mixtures thereof and further wherein the fluorescent nano-pigment is selected from the group consisting of (a) a fluorescent compound including at least one functional moiety and a stabilizer compound including at least one functional group, wherein the functional moiety associates non-covalently with the at least one functional group and wherein the fluorescent compound is a benzothioxanthene derivative; (b) a composite nanoparticle comprising a polymeric matrix comprising one or more crosslinked polymer resins and one or more fluorescent dyes, wherein the fluorescent dyes are incorporated into the polymer matrix; and mixtures thereof.

* * * * *

UNITED STATES PATENT AND TRADEMARK OFFICE
CERTIFICATE OF CORRECTION

PATENT NO.        : 8,827,393 B2                                        Page 1 of 1
APPLICATION NO.   : 13/743215
DATED             : September 9, 2014
INVENTOR(S)       : Iftime et al.

It is certified that error appears in the above-identified patent and that said Letters Patent is hereby corrected as shown below:

On the title page, item [72] 4th inventor
replace "Jennifer L. Belelle"
with --Jennifer L. Belelie--

Signed and Sealed this
Eleventh Day of November, 2014

Michelle K. Lee
*Deputy Director of the United States Patent and Trademark Office*